L. J. P. De Mirimonde,
Journal Box,
N° 19,237.                     Patented Feb. 2, 1858.

UNITED STATES PATENT OFFICE.

L. J. P. DE MIRIMONDE, OF PARIS, FRANCE.

REDUCING THE FRICTION OF JOURNALS OF AXLES ON RAILWAYS.

Specification of Letters Patent No. 19,237, dated February 2, 1858.

*To all whom it may concern:*

Be it known that I, LÉON JOSEPH POMME DE MIRIMONDE, of Paris, France, have invented certain Improvements in Reducing the Friction of Axles and Axletrees of Carriages on Railways, &c.; and I do hereby declare that the following is a full and exact description thereof, reference being had to the accompanying drawings, and to the letters of reference marked thereon.

My invention consists in the peculiar manner of mounting saddlewise in axle boxes two friction rollers, which are shaped to correspond with the journal of the axle, and in a method of lubricating the axes of the rollers and the journal itself. Bearings are provided in the axle boxes for the axes of the two saddle friction rollers, which rollers take the bearing of the journal of the axle, and thus I substitute rolling for sliding friction. To each side of the journal I affix a ring to which is connected a band or covering of some flexible material. This material dips in an oil reservoir in the bottom of the axle box, and being carried around with the axle, keeps up a continuous lubrication to the axes of the friction rollers and to the journal of the axle.

In the annexed drawings I have shown the manner in which my invention is carried into effect.

Figure 1:
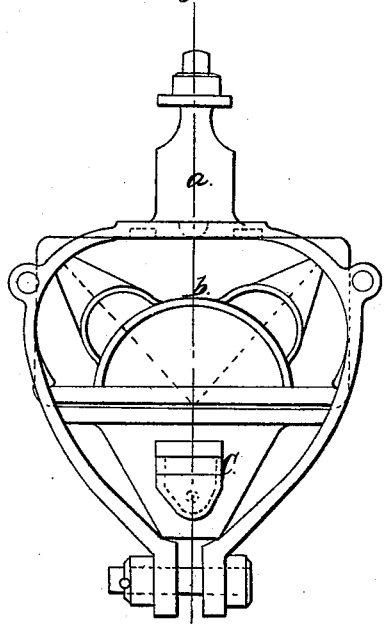
Figure 3:
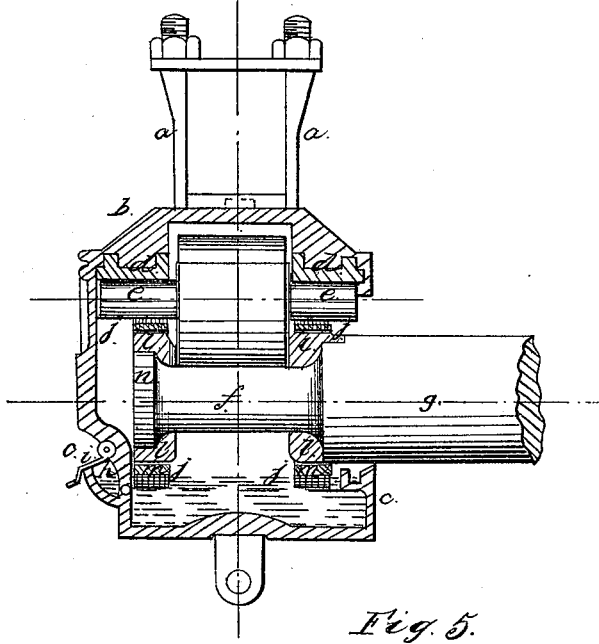
Figure 2:
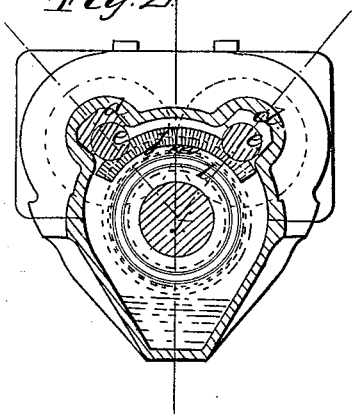

Figure 1 is a front elevation, Fig. 2, a cross section and Fig. 3 a longitudinal section of an axle box with my arrangements for reducing the friction of the axles.

The axle box is composed of two parts: an upper part $b$, and a lower part $c$; in the upper part are fixed bearings $d$ $d$ for the axes $e$ $e$ of two friction rollers, and these axes form the same piece with the rollers.

Figure 4:
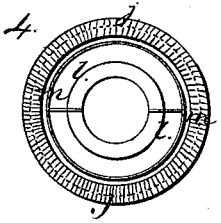
Figure 5:
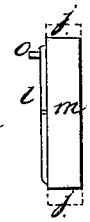

$f$ is the journal of the axle $g$; $a$ $a$ are straps through which the plates of the ordinary carriage springs pass. The lower part of the axle box $c$ forms an oil reservoir; the oil is introduced through the lip $h$, closed by a spring cover $i$. The lubrication of the axes of the friction rollers is constantly kept up by means of two annular bands $j$, $j$, formed of some flexible material, as wool, felt, flannel, &c. These bands $j$, $j$, are fixed to the axle by means of two cut rings $l$, $l$, and hoops $m$, $m$, and are carried around with it, entering continually in the oil in the reservoir; one of the rings is shown detached at Figs. 4 and 5. Each ring is formed in two pieces, as shown at Fig. 4 and is fixed on to the axle at each end of the journal thereof, as seen at Fig. 3. A metal hoop $m$ is placed over and forms a ferrule or collar to each ring, and to this hoop the flexible band is screwed or otherwise attached.

Although I prefer the method of lubrication just described, it may be varied as follows: It will be perceived that, the bearings or boxes $d$ for the journals $e$, of the friction rolls, are placed inside of the box, and that no bearing block or frame to support said rolls is used. Secondly, that the journals $e$ of the rolls, are only held in their bearings by the superincumbent weight pressing said rolls against the axle or journal which is to turn in contact with them. Thirdly that, the friction rolls are independent of each other, so that the rocking of the cars in passing over the rails does not cause one roller, or its journals, when it is sustaining more than its due weight, to injuriously affect the journals of the other roller, or its fellow, as would be the case were said rolls hung in a frame or support as heretofore done, and the weight come unevenly upon them—the tendency in such cases being to wrench or twist said frame, and consequently throwing the journal supports out of true, and causing them to cut and wear unduly. Fourthly that while I dispense entirely with the journal support or frame, which must bear against the top or bottom of the axle box, yet I do not allow the journals to extend through the sides of the box, which allows them to collect in their bearings, in such cases, dirt and dust that clings to the oil, and causes them to run hard, and wear away. My axle box is not only so shaped as to give it the greatest degree of strength, with the least possible amount of metal, but also so formed as to have the requisite strength and form at that part of it where the journals of the friction rollers rest and rotate, as to receive and bear the strain of the boxes $d$, that said journals turn in.

Wheels or rollers that dip down into a reservoir of oil, and catch and carry up the lubricating material to an axle or shaft, has been used. In my arrangement the axle, journal, or shaft, takes the lubricating material from the reservoir, and furnishes it to the journals of the friction rollers, and the friction rollers in turn furnish it to the journal $f$, of the axle $g$. The journals $e$ of the friction rolls, of course sustain the entire weight, and they being much smaller than the axle journal $f$, require more oiling than the latter. For this reason the axle $g$, furnishes oil to the journals of the rollers instead of being furnished with oil by them. There is a swell $n$, on the end of the journal $f$, as is usual in car axles; and, as the rings $l$, $m$, are subject to be worn out, and must be so made as to be readily removed and replaced by others, they must also be capable of being slipped over the head $n$ of the journal, and yet fit closely to the journal $f$, and its shoulders. To accomplish this, the inner ring $l$, is made in two parts, and the outer one $m$ is a perfect hoop, large enough to pass over the head $n$, and the sectional pieces of $l$, are then slipped underneath $m$, between it and the journal or its shoulders (being formed to snugly fit them), and a screw or screws passed through $m$, and $l$, which hold them firmly together, and the same screws may pass through the flexible material that surrounds the outer ring to hold it thereto. To cause the rings to turn with the axle, a projection $o$ (Fig. 5) may be formed on them, which may slide or fit into a recess in the axle.

One of the leading features of this invention consists in the facility with which any of the interior parts may be removed or replaced. The rollers lie loose in their bearings, and one may be removed without affecting its mate or fellow. But although loose in their bearings, they cannot when the axle journal is in place, possibly get away from their proper position.

Having thus fully described the nature and object of my invention, what I claim therein as new and desire to secure by Letters Patent is—

1. Placing the bearings $d$, in which the journals $e$, of the friction rolls run, within the axle box, and supporting them in the shell of said box, as set forth.

2. I also claim in combination with the axle or journal $f$, the hanging of the friction rolls independent of each other, so that when the weight comes unequally upon them, by the rocking of the rolling stock—one shall not wrench or cramp the other, and cause it to cut, as described.

3. I also claim the causing of the axle itself to take and carry up the lubricator from the reservoir to the journals of the friction rollers, and supplying itself through said friction rolls, substantially as described.

4. I also claim in combination with the journal $f$, the sectional ring $l$, and solid one $m$, with its flexible covering, as a carrying device for taking and conveying the oil from the reservoir, to the journals of the friction rolls, as set forth.

POMME DE MIRIMONDE. [L. S.]

Witnesses:
J. J. ARNOLD,
GEO. HUTTON.